(12) United States Patent
Andersen

(10) Patent No.: US 9,203,062 B2
(45) Date of Patent: Dec. 1, 2015

(54) BATTERY HANDLE AND COVER WITH PIVOT CAM FEATURE, AND METHOD OF ASSEMBLY

(75) Inventor: Glenn W. Andersen, Hartford, WI (US)

(73) Assignee: Johnson Controls Technology Company, Holland, MI (US)

( * ) Notice: Subject to any disclaimer, the term of this patent is extended or adjusted under 35 U.S.C. 154(b) by 656 days.

(21) Appl. No.: 13/639,185

(22) PCT Filed: Apr. 8, 2011

(86) PCT No.: PCT/US2011/031775
§ 371 (c)(1),
(2), (4) Date: Oct. 3, 2012

(87) PCT Pub. No.: WO2011/127399
PCT Pub. Date: Oct. 13, 2011

(65) Prior Publication Data
US 2013/0029199 A1    Jan. 31, 2013

Related U.S. Application Data

(60) Provisional application No. 61/322,152, filed on Apr. 8, 2010.

(51) Int. Cl.
*H01M 2/10* (2006.01)
*H01M 2/04* (2006.01)
(Continued)

(52) U.S. Cl.
CPC ............... *H01M 2/043* (2013.01); *B60L 11/14* (2013.01); *B60L 11/1877* (2013.01); *B60L 11/1879* (2013.01); *H01M 2/1005* (2013.01); *H01M 2/1072* (2013.01); *B60L 2200/12* (2013.01);
(Continued)

(58) Field of Classification Search
None
See application file for complete search history.

(56) References Cited

U.S. PATENT DOCUMENTS 2,295,768 A    9/1942  Williamson
2,829,917 A    4/1958  Wiora
(Continued)

FOREIGN PATENT DOCUMENTS

CA    2203877       3/1997
CN    86103999 A    1/1987
CN    2640048 Y     9/2004

OTHER PUBLICATIONS

International Search Report, International Application No. PCT/US2011/031775.
Written Opinion of the International Searching Authority, International Application No. PCT/US2011/031775.

*Primary Examiner* — Ula C Ruddock
*Assistant Examiner* — Matthew Van Oudenaren
(74) *Attorney, Agent, or Firm* — Boardman & Clark LLP

(57) ABSTRACT

A battery is disclosed. The battery includes a battery housing containing operable battery elements. A battery cover is secured to the battery housing and has a cover recess in an outer surface. A handle is provided which has a crossbar interconnecting first and second arms. The handle is pivotally attached to the battery cover in the recess. The battery handle is pivotable between a raised position relative to the battery cover and a lowered position in which the first and second arms and the crossbar are positioned within the cover recess. A cam is carried by the handle and positioned to interact with a surface on the battery cover. A first mating attachment element is also carried by the handle and mates with a second mating attachment element carried by the battery cover. A battery handle and a method of attaching a handle to a battery cover are also disclosed.

20 Claims, 8 Drawing Sheets

(51) Int. Cl.
*B60L 11/14* (2006.01)
*B60L 11/18* (2006.01)
*H01M 10/06* (2006.01)

(52) U.S. Cl.
CPC .......... *B60L 2200/18* (2013.01); *B60L 2200/26* (2013.01); *B60L 2200/32* (2013.01); *B60L 2200/40* (2013.01); *H01M 2/04* (2013.01); *H01M 2/0473* (2013.01); *H01M 2/10* (2013.01); *H01M 10/06* (2013.01); *Y02T 10/70* (2013.01); *Y02T 10/7005* (2013.01); *Y02T 10/705* (2013.01); *Y02T 10/7016* (2013.01); *Y02T 10/7077* (2013.01)

(56) References Cited

U.S. PATENT DOCUMENTS

| | | | | |
|---|---|---|---|---|
| 4,634,642 | A | * | 1/1987 | Lopez-Doriga |
| | | | | Lopez-Doriga ............... 429/121 |
| 5,637,420 | A | * | 6/1997 | Jones, Jr. et al. ............... 429/187 |
| 6,022,638 | A | * | 2/2000 | Horton et al. ................. 429/187 |
| 6,929,882 | B1 | * | 8/2005 | Carter .......................... 429/187 |
| 2010/0275564 | A1 | * | 11/2010 | Baetica et al. ................. 56/11.9 |

\* cited by examiner

BATTERY HANDLE AND COVER WITH PIVOT CAM FEATURE, AND METHOD OF ASSEMBLY

CROSS-REFERENCE TO RELATED APPLICATIONS

This application claims priority as a National Phase application to International Patent Application Serial No. PCT/US2011/031775, filed Apr. 8, 2011, entitled "Battery Handle and Cover with Pivot Cam Feature, and Method of Assembly," which claims priority to U.S. Provisional Patent Application, Ser. No. 61/322,152, filed Apr. 8, 2010, entitled "Battery Handle with Pivot Cam Feature," the entire contents of which is hereby incorporated by reference in its entirety.

FIELD

The present inventions relate to handles for batteries. More particularly, the inventions described herein relate to pivoting handles for batteries.

BACKGROUND

Batteries, and in particular heavy batteries such as may be used in a vehicle, are commonly equipped with handles for transport to make them easier to carry and install in and/or remove from a vehicle. Unfortunately, the handle often becomes an inconvenience once the battery is positioned for use, consuming physical space around the battery. Because of the limited open space around the battery, some handles are often designed to pivot when not in use so that less space is required. Other handles can be removed, but may be lost in the process.

Conventional pivoting battery handles are often difficult to assemble, requiring tools for assembly such as hand mallets, presses, or rollers. Battery handles that do not require tools for assembly are often insecurely attached and unreliable as the handle can detach while lifting or carrying the battery, or sliding it on or off a shelf.

Some handles are formed of a flexible member, such as a rope or strap which is permanently or removably attached to the battery. Unfortunately, flexible batteries generally do not provide for stable transport of the battery, as the battery is prone to sway or rock.

SUMMARY

Accordingly, a battery is provided. The battery includes a battery housing containing operable battery elements. A battery cover is secured to the battery housing and has a cover recess in an outer surface. A handle is provided which has a crossbar interconnecting first and second arms. The handle is pivotally attached to the battery cover in the recess. The battery handle is pivotable between a raised position relative to the battery cover and a lowered position in which the first and second arms and the crossbar are positioned within the cover recess. A cam is carried by the handle and positioned to interact with a surface on the battery cover. A first mating attachment element is also carried by the handle and mates with a second mating attachment element carried by the battery cover.

A handle for a battery is also provided. The handle includes a crossbar interconnecting first and second arms. At least one of the first and second arms has a cam on a first surface adapted to interact with a surface on a battery cover, and a mating attachment element on a second surface adapted to interact with a corresponding mating attachment element on the battery cover.

A method of attaching a handle to a battery lid is provided. The method includes pressing first and second ends of the handle into a recess on the battery cover, mating a first mating element on the handle with a second mating element in the recess, and pivoting the handle so as to engage a cam on the handle with a surface of the recess, the cam pressing against the surface of the recess and moving the handle laterally in the recess.

These and other features and advantages of various embodiments of devices, structures, systems and methods according to this invention are described in, or are apparent from, the following detailed description of various examples of embodiments of various devices, structures, systems and/or methods according to this invention.

BRIEF DESCRIPTION OF THE DRAWINGS

Various examples of embodiments of the systems and methods according to the present disclosure will be described in detail, with reference to the following figures, wherein:

FIG. 11 is a partial plan view of the battery cover or lid shown in FIG. 9 and the battery handle shown in FIG. 10;

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
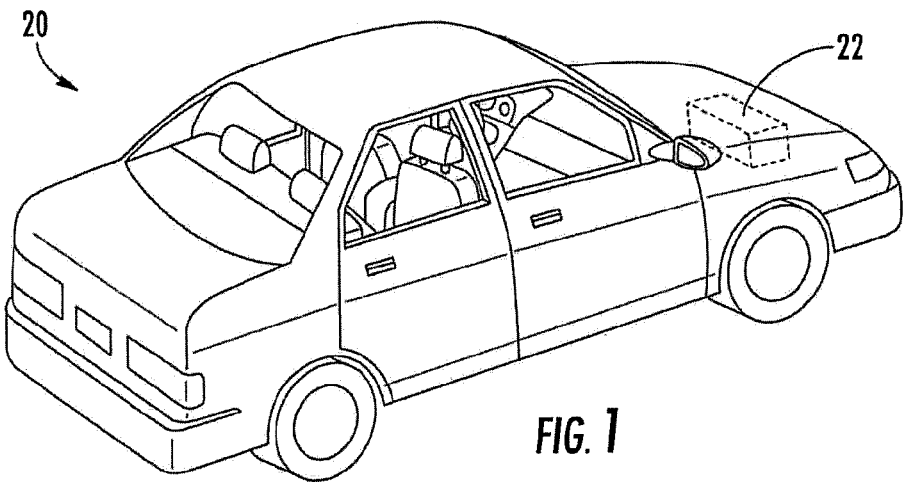
FIG. 1 is an isometric view of a vehicle including a battery according to one or more examples of embodiments.

Referring to FIG. 1, a vehicle 20 is shown that includes a battery 22 according to one or more examples of embodiments. While vehicle 20 is shown as an automobile, according to various alternative embodiments, the vehicle 20 may include any variety of types of vehicles including, among others, motorcycles, buses, recreational vehicles, boats, lawn and garden vehicles, tractors, golf cars or carts, and the like. According to one or more examples of embodiments, the vehicle 20 uses an internal combustion engine (not shown) or internal combustion engine and battery 22 for locomotive purposes. The battery 22 shown in FIG. 1 is configured to provide at least a portion of the power required to start or operate vehicle 20 and/or various vehicle systems (e.g., starting, lighting, and ignition systems ("SLI")). Further, it should be understood that the battery 22 may be utilized in a variety of applications not involving a vehicle, and all such applications are intended to be within the scope of the present disclosure.

Figure 2:
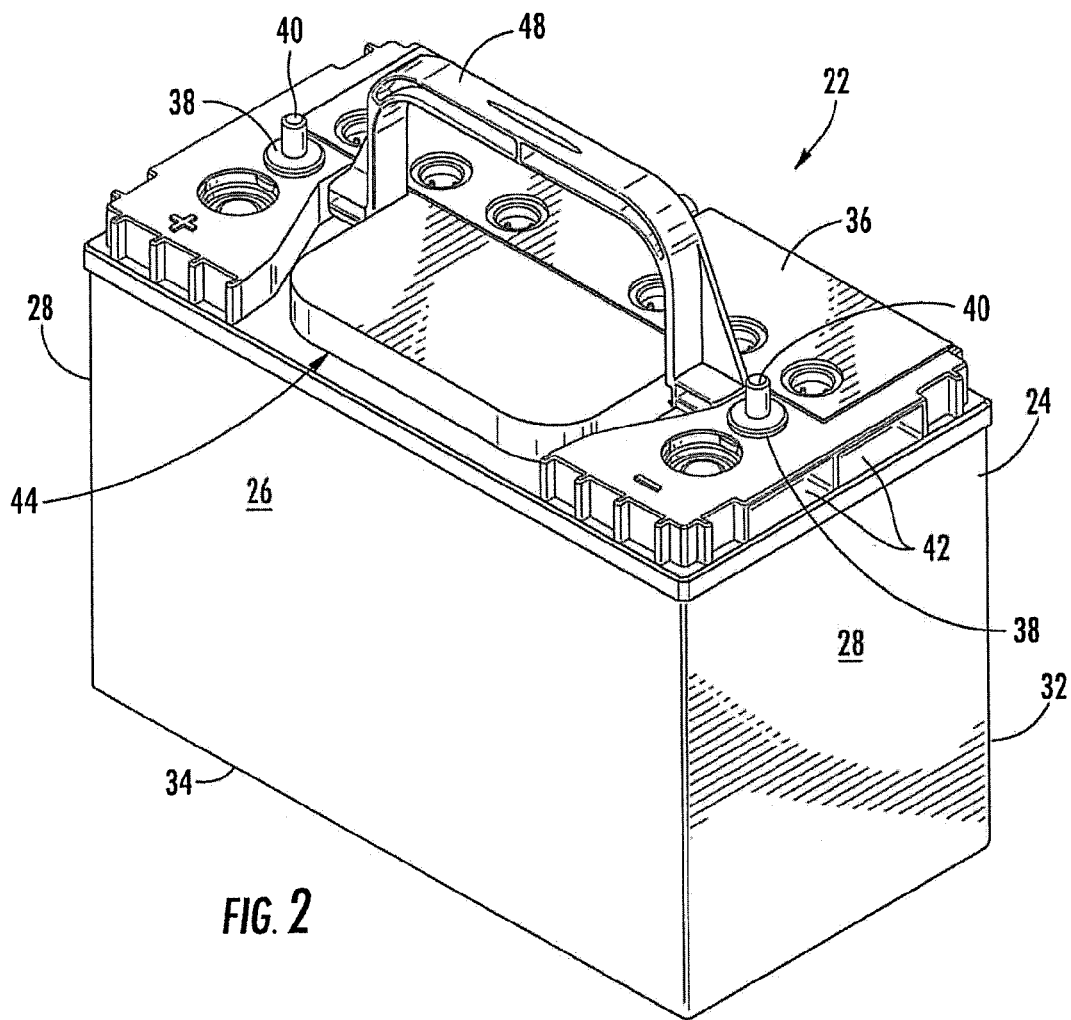
FIG. 2 is a perspective view of a battery according to one or more examples of embodiments.

The battery 22 shown in FIG. 1 may include any type of secondary battery (e.g., rechargeable battery). According to one or more examples of embodiments, the battery 22 is a lead-acid storage battery. The lead-acid storage battery 22 may be either sealed (e.g., non-maintenance) or unsealed (e.g., wet). The operable elements or components of the battery 22 are contained in a housing 24. For instance, a lead-acid storage battery 22 according to one or more examples of embodiments is illustrated in FIG. 2. A lead-acid storage battery 22 includes a plurality of plate blocks or sets (not shown) connected in series according to the capacity of the lead-acid storage battery. The plate blocks are accommodated in the battery container or housing 24 together with electrolyte, which is most commonly aqueous sulfuric acid. The battery compartment or housing 24 has a front wall 26, end walls 28, 30, a rear wall 32 and a bottom wall 34. Accordingly, the battery housing 24 formed by these walls includes a box-like base or container and is made of a moldable resin. As indicated, in various embodiments, the lead-acid storage battery 22 includes several cell elements which are provided in separate compartments of the container or housing 24 containing electrolyte. Each plate block may include one or more positive plates and negative plates (not shown), and separator material (not shown) placed between each positive plate and negative plate. It will be obvious to those skilled in the art after reading this specification that variation on the battery components or operable components used to construct the battery 22 may vary widely depending upon the desired end use and the forgoing is provided for purposes of example only.

A cover 36 is provided for or otherwise secured to the housing 24. In various embodiments, the cover 36 includes bushings 38 that allow a terminal post 40 and/or a portion of a cast-on-strap to pass into and/or through the cover. In various embodiments, the cover 36 may also include fill tubes to allow electrolyte to be added to the cells and to permit servicing. To prevent undesirable spillage of electrolyte from the fill tubes, and to permit exhausting of gases generated during the electrochemical reaction, the battery 22 may also include one or more filler hole caps and/or vent cap assemblies. The cover 36 or lid may also include finger grip pockets 42 to allow for multiple lifting options.

Figure 3:
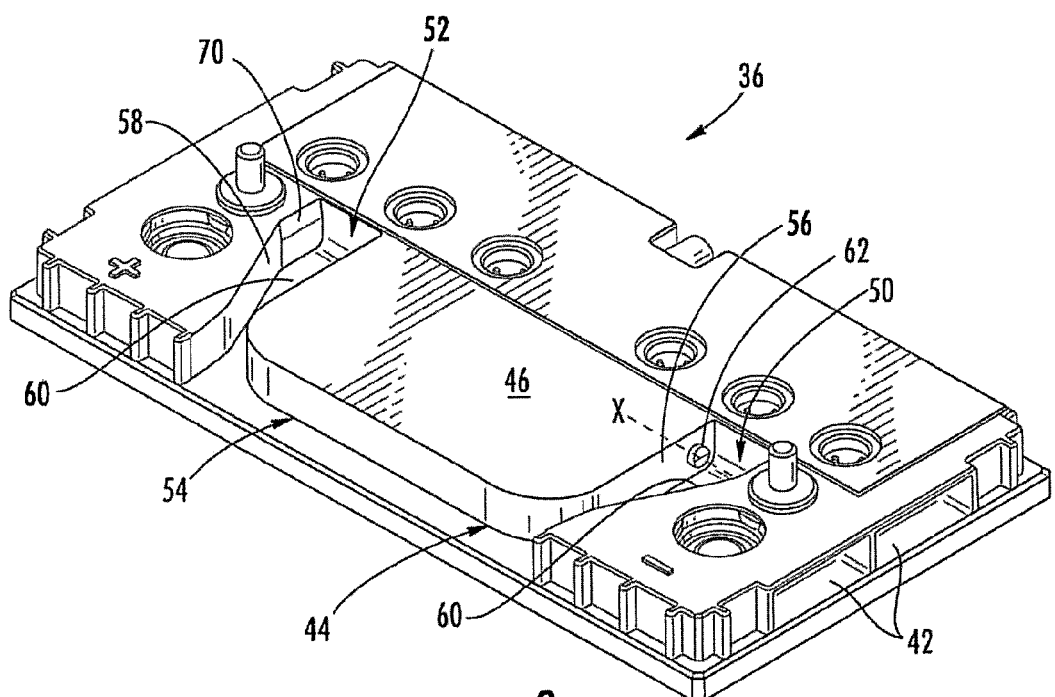
FIG. 3 is a perspective view of a battery lid or cover for the battery shown in FIG. 2 according to one or more examples of embodiments.

In various examples of embodiments, as shown in FIG. 3, the battery cover 36 defines or includes a groove or recess 44 inset in the top surface 46 of the cover. The recess 44 is adapted to receive a handle 48. In particular, the cover 36 or lid has an upper or top surface 46 and a recess 44 in the upper surface forming a handle pocket. In various examples of embodiments, the battery cover 36 is adapted to receive a handle 48 that is capable of pivoting between an upright position and a lowered position. As shown in FIG. 3, the handle 48 fits within or is received within the handle pocket or recess 44 when in the lowered position. To this end, the recess 44 has a first handle segment 50 and a second handle segment 52. The second handle segment 52 is spaced from the first handle segment 50 by a third handle segment 54 forming a handle grip or crossbar receptor or rest and interconnecting the first handle segment 50 and second handle segment 52. The first and second handle segments 50, 52 of the recess 44 include opposed inner and outer sidewalls 56, 58 interconnected by a lower surface 60 or wall. The lower surface 60 or wall and the inner sidewalls 56 are continuous within the recess 44 or pocket, and form the third handle segment 54 of the recess 44. As can be seen in FIG. 3, the shape of the recess 44 corresponds to the shape of a handle 48 to be used therewith, such that the handle 48 can be received in the recess 44. Further, the handle pocket, and in particular the lower surface 60 or wall may be angled or sloped toward the outer edge of the cover 36. While a specific example of the handle pocket or recess 44 is shown, the recess may vary in shape, width or depth to accommodate the selected handle or other desired features.

In various examples of embodiments, the battery lid or cover 36 includes a projection or knob or pivot stud which forms a mating attachment element 62 onto which a handle 48 or portion of a handle may be operatively or pivotally attached. The cover 36 may include one projection 62, or more than one projection. For example, each of the first and second handle segments 50, 52 of the recess 44 may include a projection 62. In the illustrated example, the projection 62 is positioned on a sidewall of the recess 44, and in FIG. 3, on the inner sidewall 56 of the recess 44 in the first and second handle segments 50, 52. However, the projection 62 may be positioned on the outer sidewall 58 of the recess 44 or elsewhere on the cover 36 suitable for pivotal attachment of a handle 48. The projection 62 may have a cylindrical or rounded outer surface 64 permitting pivotal movement about a centralized axis (X). The projection 62 may also optionally include a tapered outer edge 66 or end (see FIGS. 6-8). For example, a pivot stud or projection 62 may have a lead-in angle 66 or taper which is adapted for insertion of a handle 48, and in particular a lead-in angle 66 or tapered surface on the top portion 68 of the projection 62 or pivot stud that allows a portion of the handle 48 to slide over its surface. The pivot studs or projections 62 are formed of a length suitable for retention of a handle 48 against the force caused by the weight of the battery 22 in a carrying position, and a length suitable for the attachment of a handle 48 thereon. The pivot stud 62 width may be any suitable width providing acceptable support to the secure connection of the handle 48 and cover 36.

In addition to a projection 62, the recess 44 may include a facing surface 70 or surfaces adapted to engage and interact with the handle 48 or a portion of the handle. As can be seen in FIG. 3 and FIGS. 6-8, in various examples of embodiments, the facing surface 70 is curved or tapered, or slightly curved or tapered or otherwise formed of varying depth. The surface 70 may be located across the groove or recess 44 from the projection 62 on the outer sidewall 58 of the recess. However, the tapered surface may in the alternative be positioned on the inner sidewall 56 of the recess 44 or elsewhere on the cover 36 suitable for attachment of the handle 48 as described herein.

Figure 4:
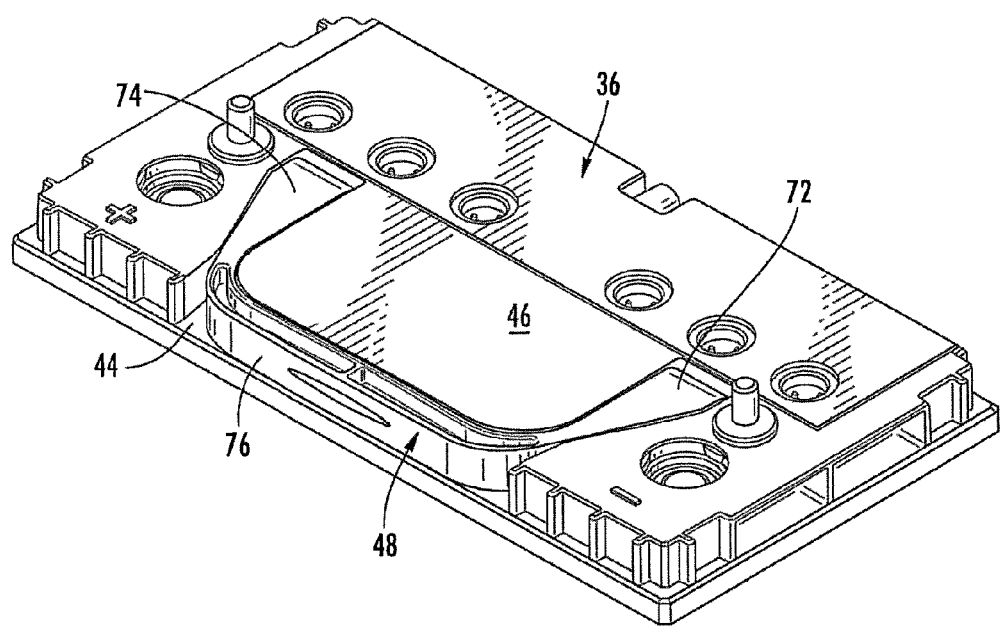
FIG. 4 is a perspective view of a battery handle according to one or more examples of embodiments attached to the battery lid or cover of FIG. 3, showing the battery handle rotated to the "down" or lowered position.
Figure 5:
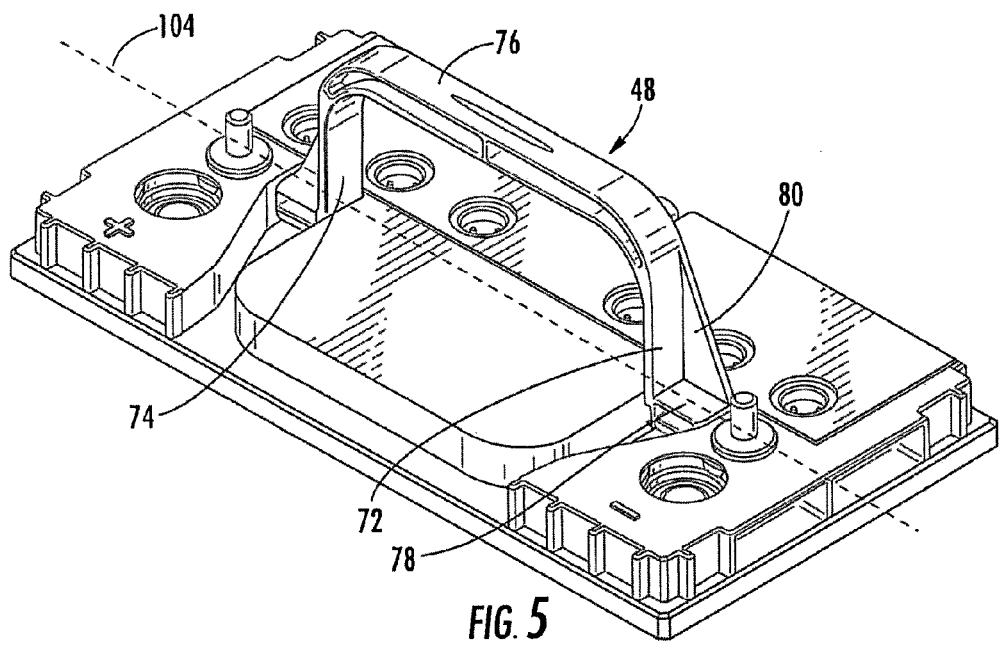
FIG. 5 is a perspective view of the battery handle according to one or more examples of embodiments attached to the battery lid or cover of FIG. 3, showing the battery handle rotated to the "up" or raised position.

As shown in FIGS. 4-5 a battery handle 48 may be incorporated into or attached to the cover 36. The battery handle 48 is pivotally attached to the battery cover 36, such that it may fold away when not in use. The handle 48 has a first arm 72 and a second arm 74, and a crossbar 76 or gripping segment interconnecting the first arm 72 and second arm 74. Each arm 72, 74 includes a cover attachment element 78, which may be further secured to the arm by a support element 80, such as can be seen in FIG. 5. The crossbar 76 of the handle 48 may be provided with a grip or gripping surface. The crossbar 76 may be positioned perpendicular to the arms 72, 74, and may be linear or include a degree of curvature. The handle 48 may also include a texture, finger depressions, or any other suitable surface treatment or overall shape. In one or more examples of embodiments, the handle 48 is rigid or of limited flexibility.

The first arm 72 and second arm 74 each have a cover attachment element 78 formed by a housing 82 having an aperture or recess or slot forming a mating attachment element 84 adapted to receive mating attachment element 62. For example, the battery handle 48 may have a slot or recess 84 adapted to fit over the projection 62 on the battery lid. The recess 84 has a shape, width, length, and depth which corresponds to or receives the shape, width, and length (or a portion thereof) of the projection 62 and permits rotation of the handle 48 about the projection 62 or projection axis (X). The recess 84 further has a lip 86 positioned between the end 88 of the handle arm 72, 74 and the recess. The lip 86 may include a sloped surface 90 or tapered surface adapted to engage or slide against the projection 62 upon attachment of the handle 48 to the cover 36, and an outer edge 92 forming a segment of the recess 84. While in the examples provided the mating attachment element on the handle 48 is a recess 84 and the mating attachment element on the cover 36 is a projection 62, these elements may be reversed to accomplish the purposes provided. Further, any suitable device adapted to provide a pivotal mating attachment of the respective components may be acceptable for the purposes provided.

Figure 6:
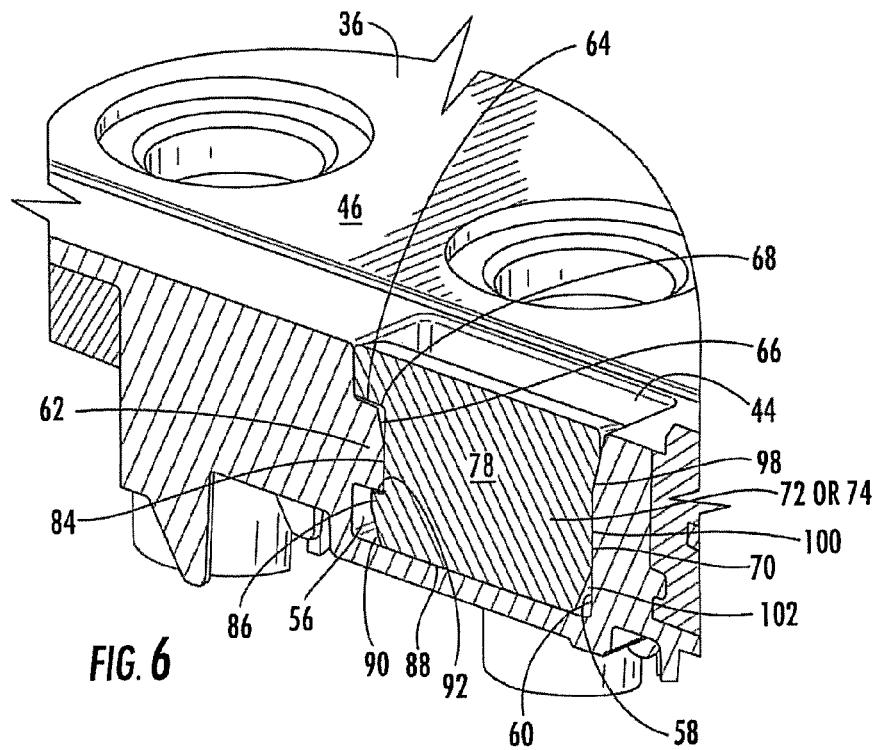
FIG. 6 is a partial cut-away perspective view of the battery handle and cover shown in FIG. 4, showing the handle-cover interface with the handle in the down or lowered position.
Figure 7:
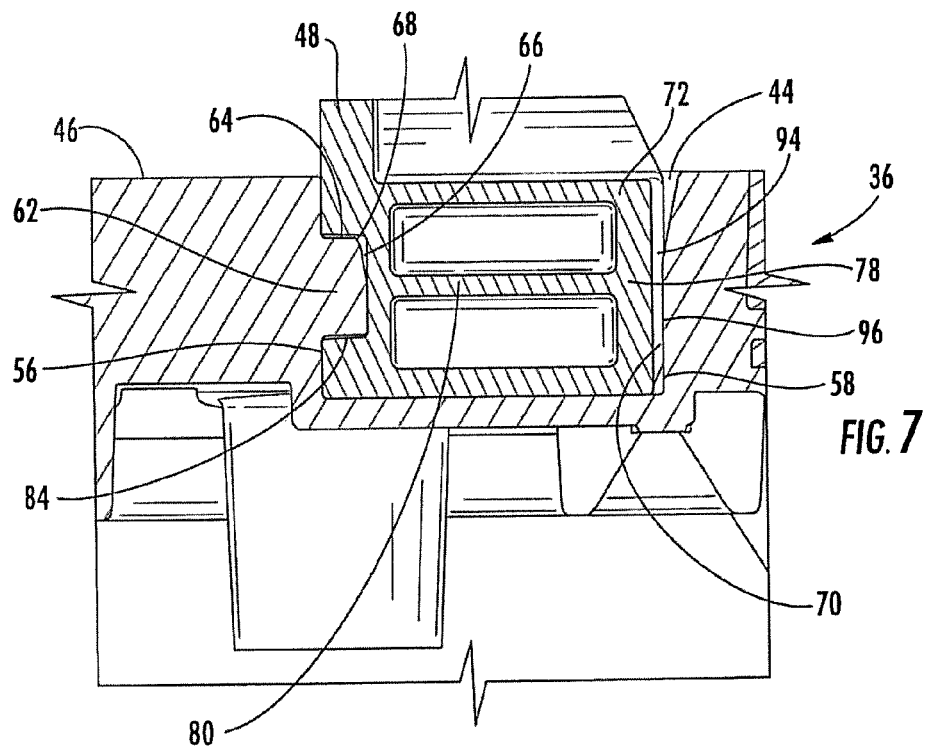
FIG. 7 is a partial cut-away view of the battery handle and cover shown in FIG. 4, showing the handle-cover interface with the handle in the up or raised position.
Figure 8:
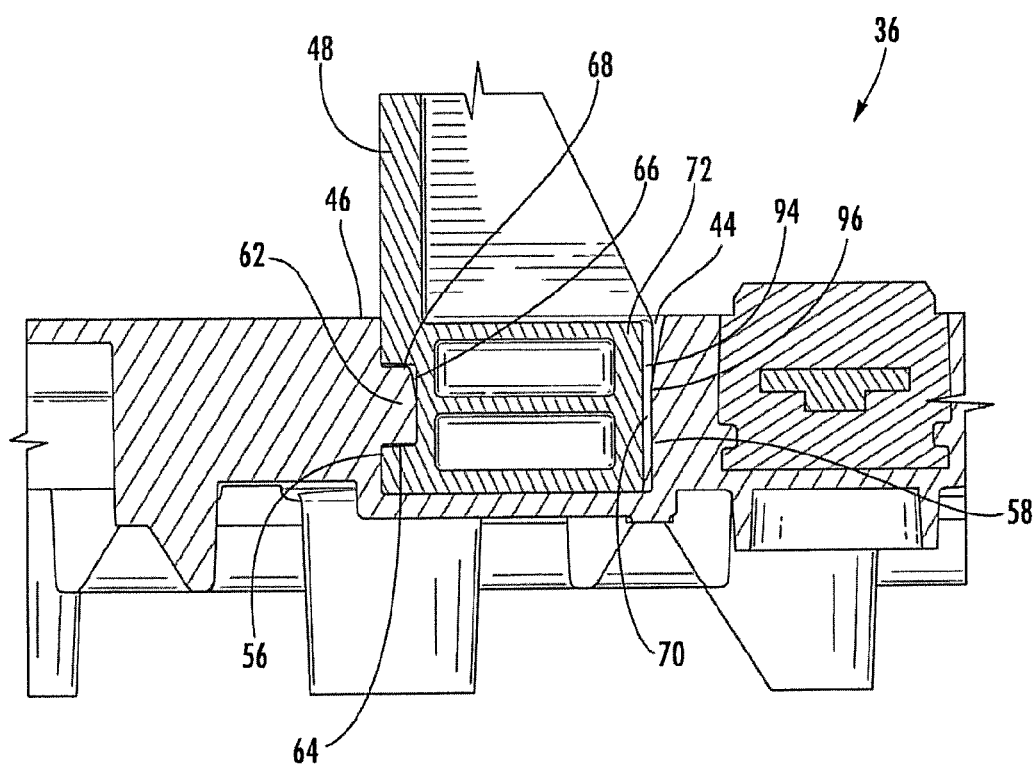
FIG. 8 is a partial cut-away view of the battery handle and cover shown in FIG. 4, showing the handle-cover interface with the handle in the up or raised position.

A wall engaging surface or cam 94 is provided on the handle 48. The cam 94 is positioned on a surface 96 of the arm 72 or 74 or the cover attachment element 78. Generally, the cam 94 is a rotating or sliding element or piece or device with an irregular shape in a mechanical linkage which transforms the rotary or pivotal motion of the handle 48 into linear motion, that is, lateral motion of the handle arm 72 or 74 within the recess 44 or groove. As shown in FIGS. 6-8, the cam 94 is positioned on the surface of the arm 72 or 74 opposite to the mating attachment element or recess 84 and facing the tapered or shaped facing surface 70 of the cover recess sidewall 58. The battery handle cam surface 94 is adapted to or configured to interact with the facing surface 70 of the battery lid 36. To this end, the cam surface 94 is provided with areas of varying depth. More specifically, the cam surface 94 has a first tapered or shaped wall surface 98 adjacent to a second tapered or shaped wall surface 100, which surface has a slope or shape that differs from the first wall surface 98. The second wall surface 100 may also be adjacent to a third tapered or shaped wall surface 102 of a slope or shape which differs from the second wall surface 100. In the illustrated example, the second wall surface 100 is positioned between the first and third tapered surfaces 98, 102. In one or more examples of embodiments, the cam surface 94 shape and depth corresponds to the shape and depth of the facing surface 70 of the sidewall 58 on the cover recess 44 (see FIG. 6) or provides a degree of freedom of movement, but provides an interference or presses against the facing surface 70 in a second orientation. While the cam 94 and handle 48 are arranged in a specific orientation, variations thereon would not depart from the scope of the present invention. Additionally, while specific examples and shapes are provided for the cam surface 94 and facing surface 70, any shape and/or number of segments suitable to create a cam effect may be acceptable for the purposes provided.

In various examples of embodiments, the ends of the handle 48 or handle arms 72, 74 are pivotally connected to the cover 36 in the groove or recess 44. In one or more examples of embodiments, the attachment location of the handle 48 on the cover 36 is positioned on or near a longitudinal centerline 104, so as to pivot at a centralized location on the cover. The handle 48 is operatively attached to the lid in the "down" or lowered position (as shown in FIGS. 4 & 6) with the projection 62 on the cover 36 positioned in the recess 84 of the handle 48 and the cam surface 94 of the handle aligned with the facing surface 70 of the groove sidewall 58 such that the cam surface shape is aligned with the corresponding shaped surface or facing surface 70 on the sidewall 58 as shown in FIG. 6. The handle 48 is operatively attached to the lid or cover 36 in the "up" or raised position (as shown in FIGS. 5, 7, & 8) with the projection 62 on the cover 36 positioned in the recess 84 of the handle 48 and the cam surface 94 of the handle arranged such that the shaped surface of the handle, or a portion thereof, is not aligned with the shape of the facing surface 70 and presses against the facing surface of the sidewall 58 due to the varying depth of each respective surface (as shown in FIGS. 7-8).

The handle 48 in one or more examples of embodiments may be operatively attached to the cover 36 by pressing the ends of the handle arms 72, 74 into the groove or recess 44, and in particular the first and second segments of the recess 44 in the cover 36 with the handle 48 oriented in the lowered position. In one or more examples, the lip 86 on the handle 48 passes over the projection 62 on the sidewall 56 of the cover recess 44 until the projection reaches the recess or aperture 84 in the handle 48 and seats therein, such as for instance snapping into place. Passing of the lip 86 over the projection 62 may be further facilitated by a projection which includes a lead-in angle 66 or tapered surface on the upper portion of the projection 62, allowing the lip 86 to gradually slide over increasing resistance caused by the projection. In the seated position, the lip 86 is pressed into place behind the projection 62. In the lowered orientation of the installed handle 48, the handle is seated as shown in FIGS. 5-6, with the crossbar 76 seated in the third handle segment 54 of the groove and the cam surface 94 of the handle 48 aligned with the shaped surface of the groove.

The handle 48 is rotated toward the upright or raised position by pivoting the handle about the pivot stud or projection 62 and moving the crossbar 76 in an arc upward away from or with respect to the cover 36. During pivotal movement, the cam 94 on the handle arm 72 or 74 encounters and engages the facing surface 70 in the groove 44. As shown in FIGS. 7 and 8, the cam 94, and in particular the shaped or tapered surface of the cam 94 which forms at least in part a raised surface, presses against the shaped or tapered facing surface 70 of the groove which may likewise include, at least in part, a raised surface, moving the arm 72 or 74, including the housing 82, laterally in the direction of the opposite sidewall 56 of the groove which carries the pivot stud 62. The interaction of the cam surface 94 and facing surface 70 of the groove, by the pressing of the arm 72 or 74 of the handle 48 toward or into the pivot stud 62, recesses the pivot stud deeper into the cavity or recess 84 on the handle, further securing and strengthening the attachment of the handle 48 to the cover 36. Pivoting the handle 48 away from the lowered position (e.g., toward the upright position) also moves the lip 86 from below the projection 62 to the side of the projection, strengthening the connection against a lifting force. Upon rotation of the handle 48 to approximately ninety (90) degrees from the surface of the cover 36, or from its lowered position, the projection is substantially fully inserted into the cavity or recess 84 in the handle 48 and the cam 94 is fully engaged with and pressing against the corresponding sidewall facing surface 70. The handle 48 may be pivoted back to its lowered position by overcoming the resistance generated by the cam 94 against the facing or adjacent surface of the cover 36 and rotating the handle 48 back into the recess 44 or groove on the cover.

One handle arm 72 or 74 and cover segment corresponding features are described hereinabove with regard to the operative attachment of the arm 72 or 74 and handle 48 to the cover 36 for purposes of example and ease of discussion only. The same discussion may equally apply to both handle arms, cover segments and corresponding components.

Figure 9:
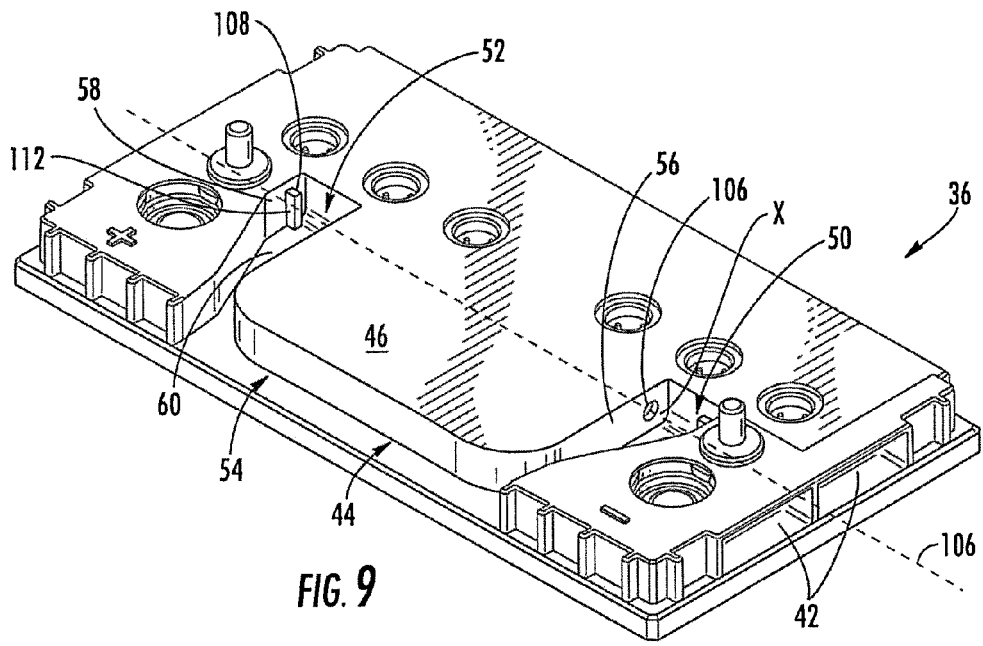
FIG. 9 is a perspective view of a battery cover for use with the battery shown in FIG. 2, according to one or more alternative examples of embodiments.
Figure 10:
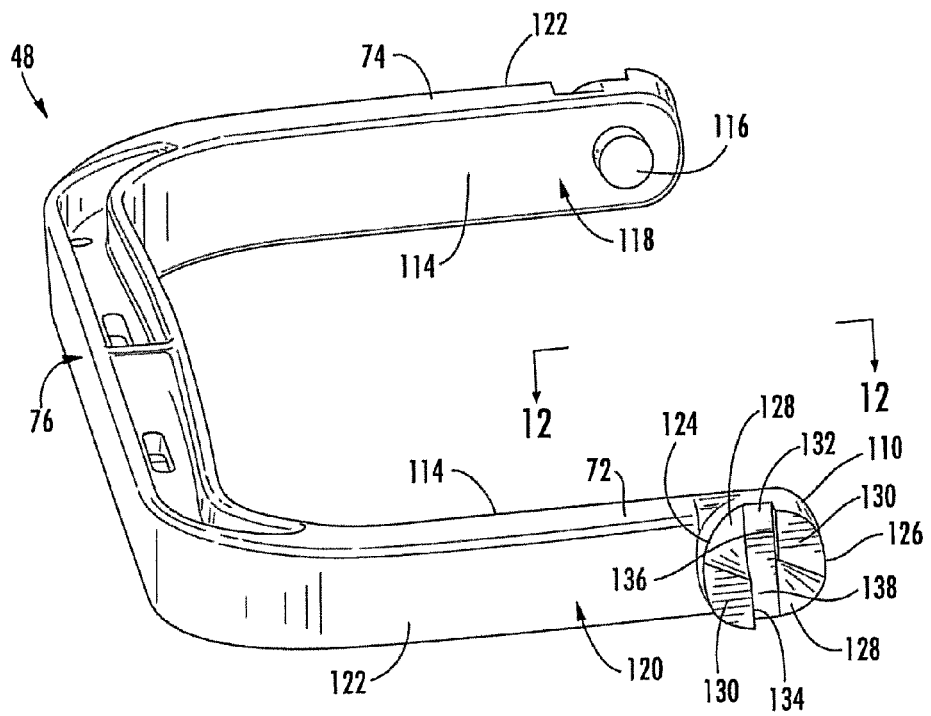
FIG. 10 is a perspective view of a battery handle for use with the battery cover shown in FIG. 9, according to one or more examples of alternative embodiments.
Figure 17:
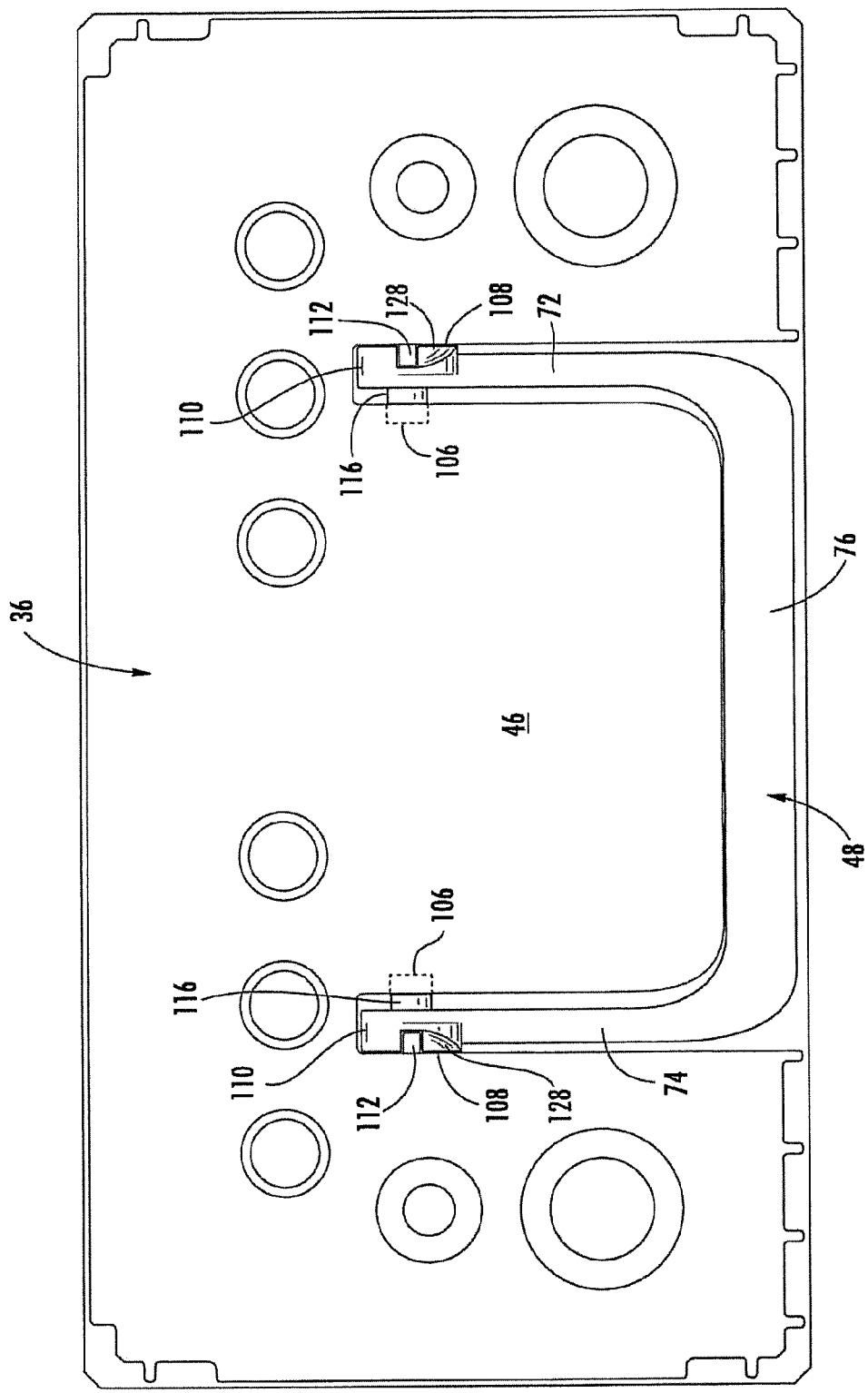

FIGS. 9 and 10 show a battery lid or cover 36 and battery handle 48, respectively, according to one or more alternative examples of embodiments. In the embodiments shown in FIGS. 9-10, with the exception of the features detailed below, the battery cover 36 and handle 48 are substantially identical to the battery cover 36 and handle 48 shown in FIGS. 3-8 and like reference numbers have been used to describe like components.

In the embodiments shown in FIGS. 9-10 the attachment elements in the recess segments 50, 52 of the cover 36 and on the arms 72, 74 of the handle 48 are provided with various alternative features. As shown in FIG. 9, the battery lid or cover 36 includes an attachment feature or mating attachment element 106 formed by an aperture or recess or cavity in a sidewall 56. The aperture or recess 106 in the illustrated example is provided on the inner sidewall 56, but may be provided on the outer sidewall 58 of the groove or elsewhere in the recess 44 without departing from the overall scope of the present invention. The recess 106 is shaped and/or sized to mate with or receive a corresponding mating attachment element 116 on the handle arm 72 or 74 and permit pivotal movement. The recess 106 illustrated in FIG. 9 is cylindrical or has a cylindrical surface.

The groove or recess 44 of the cover 36 also includes a facing surface 108 which may act upon a cam 110. In the illustrated example, on the opposing side or sidewall of the groove, i.e., the outer sidewall 58 in FIG. 9, the facing surface 108 is formed by or composed of a protrusion or projection, such as but not limited to a rib 112. The facing surface 108 is therefore provided with varying depth. In the illustrated example, the rib 112 is a rectangular shaped projection extending vertically on the outer sidewall 58 of the groove. However, any suitable shape, size and positioning of the projection 112 to accomplish the purposes provided herein may be acceptable for use. As a non-limiting example, the rib 112 may be horizontally arranged rather than vertically oriented.

One or more alternative examples of a handle 48 for use with the cover 36 shown in FIG. 9 are shown in FIG. 10. In various examples of embodiments, the end of the handle 48 and more specifically, the end of each arm 72 or 74 includes two sides or surfaces that engage the battery cover 36 on the sidewalls 56, 58 of the cover groove 44. A first side 114 has a mating attachment element 116 formed by a projection or knob or pivot stud extending from an outer surface of the arm 72 or 74. In the example shown in FIG. 10, the projection 116 or pivot stud extends from the inner facing surface 118 of the arm 72 or 74, although the pivot stud may be located on the outer facing surface 120 or elsewhere on the arm suitable for the purposes provided. The projection 116 or pivot stud includes a shape, size, and/or dimension suitable for mating with an adjacent mating attachment element 106 on the cover 36 and for pivoting about an axis (X). The projection 116 or pivot stud in the illustrated embodiment is a round or cylindrical element extending a distance from the inner surface. However, any suitable shape, size or dimension suitable for the pivotal retention of the handle 48 on the cover 36 may be acceptable for the purposes provided.

The second side 122 of the handle arm 72 or 74 is provided with a cam 110 adapted to interact with the facing surface 108 of the cover groove. The cam 110 is provided with one or more surfaces of varying depth. In particular, the second side of the arm 72 or 74 has a cam element 110 formed by a first cam surface 124 and a second cam surface 126. In FIG. 10, the cam element 110 is formed by two generally semi-circular cams 124, 126. Each semi-circular cam 124, 126 includes a ramp segment or inclined portion 128 adjacent and continuous with a raised segment 130. A recess, shown as slot 132 is defined or formed on two sides by the semi-circular cams 124, 126. In particular, the inner edge 134, 136 of each cam forms the outer edges of the recess or slot 132. The lowest segment of each cam ramp segment 128 is flush with the lower or bottom surface 138 of the slot 132. The ramp 128 increases in height from the lowest segment toward the raised segment 130. The two cam surfaces or semi-circular cams 124, 126 are oppositely oriented such that the respective ramp portions 128 are not adjacent to one another. In the illustrated example shown in FIG. 10, the slot 132 is shaped or sized or otherwise includes dimensions which correspond with the shape of the projection 112 in the cover groove. As can be seen in FIG. 10, the slot 132 is generally rectangular, although any suitable shape, size or dimension may be acceptable for the purposes provided.

Figure 12:
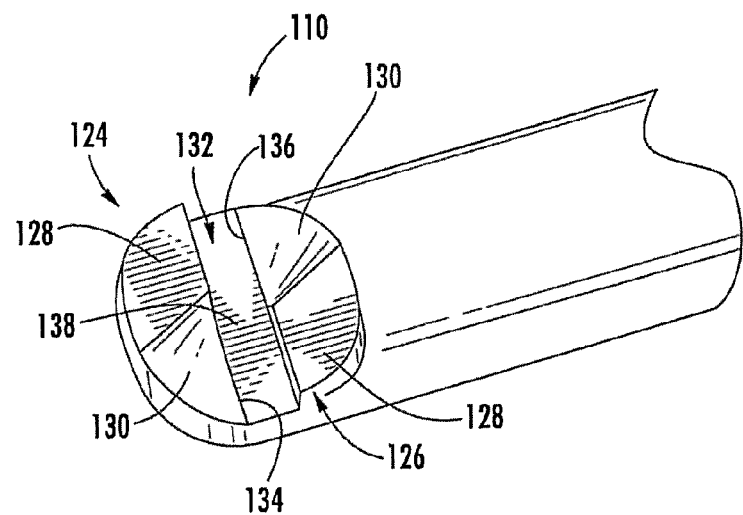
FIG. 12 is a partial perspective view the battery handle shown in FIG. 10, taken from line 12-12 of FIG. 10.
Figure 13:
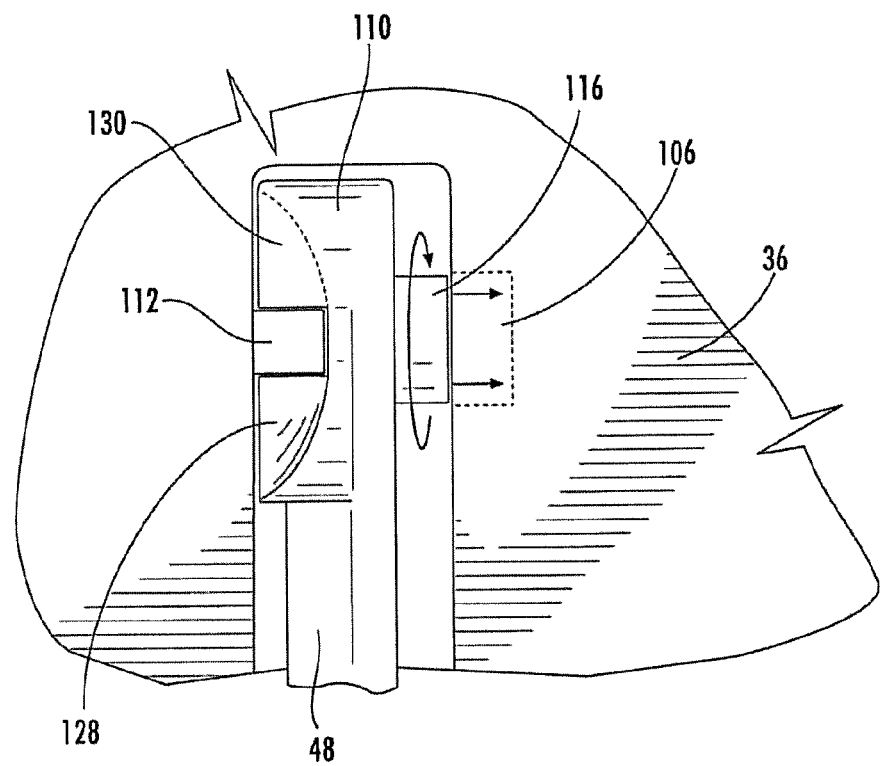
FIG. 13 is a partial plan view of the battery lid shown in FIG. 9 and battery handle shown in FIG. 10, showing the battery handle inserted into the battery cover.

In various examples of embodiments, the ends of the handle 48 are pivotally connected to the cover 36 in the groove or recess 44. In one or more examples of embodiments, the attachment location of the handle 48 on the cover 36 is positioned on or near a longitudinal centerline 104, so as to pivot at a centralized location on the cover. The handle 48 is operatively attached to the cover 36 in the "down" or lowered position (as shown in FIGS. 11-13) with the projection 116 on the handle arm 72 or 74 positioned adjacent to or in the recess 106 or aperture of the cover sidewall 58 and the cam 110 on the handle 48 aligned with the facing surface 108 such that the slot 132 on the cam element 110 mates with or receives the rib 112 on the cover 36. The handle 48 is operatively attached to the lid or cover 36 in the "up" or raised position (referring to FIGS. 11-13) with the projection 116 on the handle arm 72 or 74 positioned in the recess 106 or aperture of the groove sidewall 56 and the cam element 110 of the handle 48 arranged such that the slot 132 is perpendicular to the rib 112 on the cover 36 and the rib is in contact with the upper or raised segments 130 of the semi-circular cam elements 124, 126.

While one arm 72 or 74 of the handle 48 and segment 50 or 52 of the cover recess 44 are described above for purposes of example and ease of discussion, identical features may also be provided on the additional arm 72 or 74 of the handle 48 and segment 50 or 52 of the cover recess. Likewise, while the mating attachment elements 106, 116 and cam 110 and facing surface 108 are described with respect to either the cover 36 or the handle 48, these features may be reversed without departing from the overall scope of the present invention.

In operation, as illustrated in FIGS. 11-13, the handle 48 is connected to the cover 36 by orienting the handle 48 in the lowered orientation and placing it or sliding it downwardly into the groove on the cover 36 such that the slot 132 on the cam element 110 aligns the rib 112 in the sidewall groove. The pivot stud 116 on the handle 48 may also be received in the aperture 106 or cavity on the groove 44 of the cover 36 or lid. When the inserted handle 48 is pivoted upwards, such that the crossbar 76 of the handle 48 moves in an arc about the pivot stud 116, raising the crossbar 76 above the surface of or with respect to the cover 36 and out of the groove or recess 44, the cam 110, and in particular the ramp segment 128 of each cam segment engages the rib 112. As the handle 48 is rotated, the rib 112 slides up each ramp segment 128 which simultaneously pushes the handle arm 72 or 74 laterally toward the sidewall of the groove opposite the facing surface 108 such that the projection 116 enters or is further pressed into the cavity or recess or aperture 106. Upon rotation of the handle 48 to approximately ninety (90) degrees from the surface of the cover 36 or from its lowered position, the projection 116 is substantially fully inserted into the cavity or aperture 106 and the rib 112 is positioned against the upper segments 130 or surfaces of the cam 110. The handle 48 may be pivoted back to its lowered position by overcoming the resistance generated by the cam 110 against the adjacent facing surfaces of the cover 36 and rotating the handle 48 back into the recess 44 or groove on the cover 36. While a single arm 72 or 74 having a cam 110 and facing surface 108 and single mating attachment elements 106, 116 are described for purposes of example, the same description may apply equally to the additional arm 72 or 74, cover recess segment and corresponding components.

The handle 48 and the cover 36 described herein in the various embodiments, may be formed by any suitable means and of any suitable material known in the art. For example, the handle 48 and/or the cover 36 may be formed of a plastic or durable plastic or polymer or other composite material and may be formed by mold or cast. The various apertures, cam surfaces, cam elements, and projections described herein may be formed integrally as a unitary body with the cover 36 or with the handle 48, respectively, or may be separately formed and/or separately attached. For example, an aperture may be later formed by drill. In another example, handle pivot studs may be formed by a slide-in mold.

The handle and cover described herein provide various advantages over traditional handle structures on a battery. For instance, the handle and cover include a pivot geometry that allows for easy assembly of the handle to the cover on existing secondary battery covers or any suitable battery cover in the fold-away or lowered position. Further, a pivoting battery handle is provided which is attached to the battery without tools. In particular, pivot studs on one or more examples of the battery cover are provided with a lead-in angle that allows for easy insertion and attachment of the handle on the lid. Due to the easy assembly of the handle on the cover, handles can be assembled on the battery at the shipping or decoration line in the assembly process. In addition, the handle pocket is angled toward the outside edge of the lid which promotes water removal from the battery cover.

The embodiments described herein also provide a handle that securely locks onto the battery when in the lifting position and provides a handle/battery cover interface with improved handle retention strength. For example, the handle and cover interface includes a cam that locks the handle in the lifting position or provides a tight fit in the raised position of the handle, pressing a pin or pivot stud into a correspondingly shaped recess, thereby securing the handle tightly to the cover and improving retention of the handle on the battery and/or preventing the handle from slipping out of the cover during lifting or carrying. In addition, the handle pivots in center of cover providing balanced support of battery in the carrying position.

Accordingly, a battery handle and cover or lid are provided that reduce insertion forces and maximize retention forces of the handle on the cover. The handle is better secured to the lid such that the handle may be used to lift the battery with less chance that the handle will come free of the battery lid or cover. In addition, the battery handle may be pivoted back to its original position, which is often advantageous once the battery is installed in a vehicle, as well as for transport and storage, maximizing the space around the battery.

These and other features and advantages of various embodiments of systems and methods according to this invention are apparent from the foregoing detailed description of various examples of embodiments of various devices, structures, and/or methods according to this invention.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the figures. It should be recognized that the orientation of particular components may vary greatly depending on the application in which they are used.

It is also important to note that the construction and arrangement of the battery handles and covers, as shown in the various examples of embodiments, is illustrative only. While the battery handles and covers, according to this invention, have been described in conjunction with the examples of embodiments outlined above, various alternatives, modifications, variations, improvements, and/or substantial equivalents, whether known or that are or may be presently unforeseen, may become apparent. Accordingly, the examples of embodiments of the battery handle and cover, according to this invention, as set forth above, are intended to be illustrative, not limiting. Various changes may be made without departing from the spirit and scope of the invention. Therefore, the description provided above is intended to embrace all known or later-developed alternatives, modifications, variations, improvements, and/or substantial equivalents.

What is claimed is:

1. A battery comprising:
a battery housing containing operable battery elements;
a battery cover secured to the battery housing and having a cover recess in an outer surface, a portion of the cover recess being defined by opposed first and second walls, the first wall having a first mating attachment element, and the second wall having a cam engaging surface; and
a handle having a crossbar coupled to an arm, the arm carrying a cam on a first side and a second mating attachment element on a second side opposite the first side, the handle being pivotally attached to the battery cover in the recess, the battery handle being pivotable between a first position and a second position relative to the battery cover, wherein during pivotal movement of the handle from the first position to the second position, the cam engages the cam engaging surface creating lateral motion from the first side of the arm to the second side of the arm such that the second mating attachment element engages the first mating attachment element to assist in retaining the handle in the cover recess when the handle is in the second position.

2. The battery of claim 1, wherein the first mating attachment element is a projection and the second mating attachment element is an aperture adapted to receive the projection.

3. The battery of claim 1, wherein the cam engaging surface on the battery cover is a surface of varying depth.

4. The battery of claim 3, wherein the cam is a cam surface having a varying depth which aligns with the cam engaging surface on the battery cover in a first position, and engages the cam engaging surface on the battery cover in a second position.

5. The battery of claim 1, wherein the cam engaging surface on the battery cover is a rib.

6. The battery of claim 5, wherein the cam is a cam element having a ramp segment and a raised segment which interact with the rib.

7. The battery of claim 6, wherein the cam element includes a recess adapted to receive the rib and spacing a second ramp segment and a second raised segment.

8. The battery of claim 7, wherein the recess is a slot.

9. A handle for a battery comprising a crossbar interconnecting first and second arms, at least one of the first and second arms having a cam on a first surface and a mating attachment element on a second surface opposite the first surface, the cam is adapted to interact with a surface on a battery cover such that the arm laterally moves from the first surface toward the second surface as the handle rotates about the battery cover, enabling the mating attachment element on the second surface to interact with a corresponding mating attachment element on the battery cover to assist in retaining the handle in the battery cover.

10. The handle of claim 9, wherein the mating attachment elements on the handle is a projection and the mating attachment element on the battery cover is a recess.

11. The handle of claim 9, wherein the cam is a cam surface having surfaces of varying depth, and the surface on the battery cover is a facing wall surface having varying depth, the cam surface being arranged to interact with the facing wall surface to laterally move the handle arm as the handle rotates about the battery cover.

12. The handle of claim 9, wherein the cam is a cam element having a ramp segment and a raised segment.

13. The handle of claim 12, wherein the cam element has a second ramp segment and a second raised segment.

14. The handle of claim 12, wherein the cam element is a first cam element separated from a second cam element by a recess, the second cam element having a second ramp segment and a second raised segment.

15. The handle of claim 14, wherein the recess is a slot.

16. The handle of claim 9, wherein each of the first and second arms has a cam on a first surface and a mating attachment element on a second surface, the second surfaces being parallel to each other, each cam is adapted to interact with a separate surface on the battery cover such that the arm laterally moves from the first surface toward the second surface of each arm as the handle rotates about the battery cover, enabling the mating attachment elements on the second surface of each arm to interact with a corresponding mating attachment element on the battery cover to assist in retaining the handle in the battery cover.

17. The battery of claim 1, wherein the handle in the first position is a raised position relative to the battery cover, and the handle in the second position is a lowered position relative to the battery cover where the arm and a portion of the crossbar are received by the cover recess.

18. A battery comprising:
a handle having a crossbar interconnecting a first arm spaced from a second arm, each of the arms having a first side opposing a second side, the second sides of each arm facing one another, the first sides carrying a cam, and the second sides carrying a first mating attachment element; and
a cover for the battery, the cover having a first handle segment spaced from a second handle segment, the first and second handle segments each having a facing surface opposite a second mating attachment element, the first handle segment pivotally engages the first arm, and the second handle segment pivotally engages the second arm such that the cover retains the handle, the pivotal engagement being formed by the battery handle being raised from a lowered position relative to the battery cover to a raised position relative to the battery cover, wherein during pivotal movement of the handle from the lowered position to the raised position, each cam engages the respective facing surface creating lateral motion from the first side of each arm toward the second side of each arm such that the first mating attachment elements engage respective second mating attachment elements.

19. The battery of claim 18, wherein each facing surface on the battery cover is a rib, and each cam includes a ramp segment and a raised segment, such that the rib interacts first with the ramp segment followed by the raised segment as the handle is pivoted from the lowered position to the raised position.

20. The battery of claim 18, wherein each cam has a varying depth, and each facing surface on the battery cover has a surface of a varying depth, such that each cam aligns with the facing surface on the battery cover in the lowered position, and engages the facing surface on the battery cover in the raised position.

* * * * *